(12) United States Patent
Rygiel

(10) Patent No.: US 8,922,776 B2
(45) Date of Patent: Dec. 30, 2014

(54) CONFOCAL LASER SCANNING MICROSCOPE AND A METHOD FOR INVESTIGATING A SAMPLE

(75) Inventor: Reiner Rygiel, Altrip (DE)

(73) Assignee: Leica Microsystems CMS GmbH, Wetzler (DE)

( * ) Notice: Subject to any disclaimer, the term of this patent is extended or adjusted under 35 U.S.C. 154(b) by 0 days.

(21) Appl. No.: 13/988,784

(22) PCT Filed: Nov. 22, 2011

(86) PCT No.: PCT/EP2011/070623
§ 371 (c)(1),
(2), (4) Date: Sep. 6, 2013

(87) PCT Pub. No.: WO2012/069443
PCT Pub. Date: May 31, 2012

(65) Prior Publication Data
US 2013/0342834 A1    Dec. 26, 2013

(30) Foreign Application Priority Data

Nov. 23, 2010 (DE) .......................... 10 2010 060 747

(51) Int. Cl.
| | |
|---|---|
| G01N 21/00 | (2006.01) |
| G01J 3/02 | (2006.01) |
| G01J 3/14 | (2006.01) |
| G01J 3/36 | (2006.01) |
| G02B 21/00 | (2006.01) |
| G02B 27/14 | (2006.01) |

(52) U.S. Cl.
CPC ............. *G01J 3/0205* (2013.01); *G01J 3/0229* (2013.01); *G01J 3/0237* (2013.01); *G01J 3/14* (2013.01); *G01J 3/36* (2013.01); *G02B 21/0076* (2013.01); *G02B 21/008* (2013.01); *G02B 27/141* (2013.01)
USPC .......................................... 356/432; 356/436

(58) Field of Classification Search
CPC ............ G01N 21/6458; G01N 21/648; G01N 21/4795; G01N 33/585; G01N 21/25; G01N 21/6486; G01N 23/046; G01N 33/532; G01N 2021/6419; G01N 21/64; G01N 1/31; G01N 1/405; G01N 2021/6421; G01N 2021/6441
See application file for complete search history.

(56) References Cited

U.S. PATENT DOCUMENTS

| | | | |
|---|---|---|---|
| 4,084,180 A | | 4/1978 | Stoffels et al. |
| 5,886,784 A | * | 3/1999 | Engelhardt .................... 356/326 |
| 6,255,646 B1 | * | 7/2001 | Shimada ........................ 250/234 |
| 2001/0043403 A1 | | 11/2001 | Engelhardt |
| 2006/0146325 A1 | | 7/2006 | Wachsmuth et al. |
| 2006/0203241 A1 | | 9/2006 | Schreiber |
| 2006/0245049 A1 | | 11/2006 | Knebel |

FOREIGN PATENT DOCUMENTS

| | | |
|---|---|---|
| DE | 4330347 C2 | 3/1995 |
| DE | 10016361 A1 | 10/2001 |

(Continued)

*Primary Examiner* — Michael P Stafira
(74) *Attorney, Agent, or Firm* — Leydig, Voit & Mayer, Ltd.

(57) ABSTRACT

A confocal laser scanning microscope for examining a sample has a light source, which generates an illumination light beam, and a scanning unit which deflects the illumination light beam such that it optically scans the sample. A main beam splitter separates the illumination light beam from detection light emerging from the sample. The detection light separated from the illumination light beam passes at least partially through a detection pinhole diaphragm. At least two detector units detect the detection light passing through the detection pinhole diaphragm. An optical element is arranged in the beam direction between the detection pinhole diaphragm and the detector units and splits the detection light into at least two beam bundles and spectrally decomposes it within the beam bundles.

9 Claims, 2 Drawing Sheets

(56) References Cited

FOREIGN PATENT DOCUMENTS

| | | |
|---|---|---|
| DE | 10334145 A1 | 2/2005 |
| JP | 09502269 A | 3/1997 |
| JP | 2000098245 A | 4/2000 |
| JP | 2006524802 A | 11/2006 |
| WO | WO 9964915 | 12/1999 |
| WO | WO 2004097491 A1 | 11/2004 |

* cited by examiner

CONFOCAL LASER SCANNING MICROSCOPE AND A METHOD FOR INVESTIGATING A SAMPLE

CROSS-REFERENCE TO RELATED APPLICATIONS

This application is a U.S. national phase application under 35 U.S.C. §371 of International Application No. PCT/EP2011/070623, filed on Nov. 22, 2011, and claims benefit to German Patent Application No. DE 10 2010 060 747.9, filed on Nov. 23, 2010. The international application was published in German on May 31, 2012, as WO 2012/069443 A1 under PCT Article 21(2).

FIELD

The invention relates to a confocal laser scanning microscope and to a method for investigating a sample.

BACKGROUND

A confocal laser scanning microscope is suitable for investigating a microscopic sample. For this purpose, fluorescent markers that form connections to structures of the sample, or to elements participating in processes in the sample, are introduced into the sample. The fluorescent markers can be activated with the aid of excitation light in such a way that they are excitable to fluoresce and/or are excited to fluoresce, with the result that the structures and/or processes in the sample are made visible. Fluorescent light proceeding from the sample, which in this connection can also be referred to as "detected light," is separated from the illumination light and directed via a detection aperture onto a detector unit.

A scanning unit causes the illumination light beam to optically scan the sample. The detected light is detected as a function of positions of the scanning unit, so that the region of the sample from which the detected light is currently deriving is known at every point in time during detection, so that an image of the sample can subsequently be created on the basis of the acquired data.

The wavelength regions of the fluorescent light depend on the fluorescent markers. In other words, different fluorescent markers light up in different colors when they are excited to fluoresce. It is known to investigate the individual fluorescent markers, and the structures of the sample and/or processes in the sample connected to them, independently of one another by illuminating the sample exclusively with illumination light from a predetermined wavelength region, so that only a specific type of fluorescent markers is excited to fluoresce; or the detected light can be filtered with the aid of a color filter in such a way that only detected light of one or a few fluorescent makers arrives at the detector unit.

DE 43 30 347 C2 discloses an apparatus for selecting and detecting at least two spectral regions of a light beam, in which apparatus a light beam is spectrally divided. The divided light beam strikes a mirror aperture that allows part of the light to pass through to a first detector unit and reflects the remainder of the light to a second detector unit.

SUMMARY

An aspect of the present invention is to provide a confocal laser scanning microscope and a method for investigating a sample that make it possible, in simple fashion, to investigate different spectral regions of the detected light.

In an embodiment, the present invention provides a confocal laser scanning microscope for investigating a sample. The microscope includes: a light source configured to generate an illumination light beam; a scanning unit configured to deflect the illumination light beam in such a way that the illumination light beam optically scans the sample; a main beam splitter configured to separate the illumination light beam from detected light proceeding from the sample; a detection aperture configured to allow the detected light separated from the illumination light beam to pass through the detection aperture, at least in part; at least two detector units configured to detect the detected light passing through the detection aperture; and an optical element disposed between the detection aperture and the detector units in the beam direction, wherein the optical element is configured to separate the detected light into at least two beam bundles and spectrally divide the detected light within the beam bundles.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
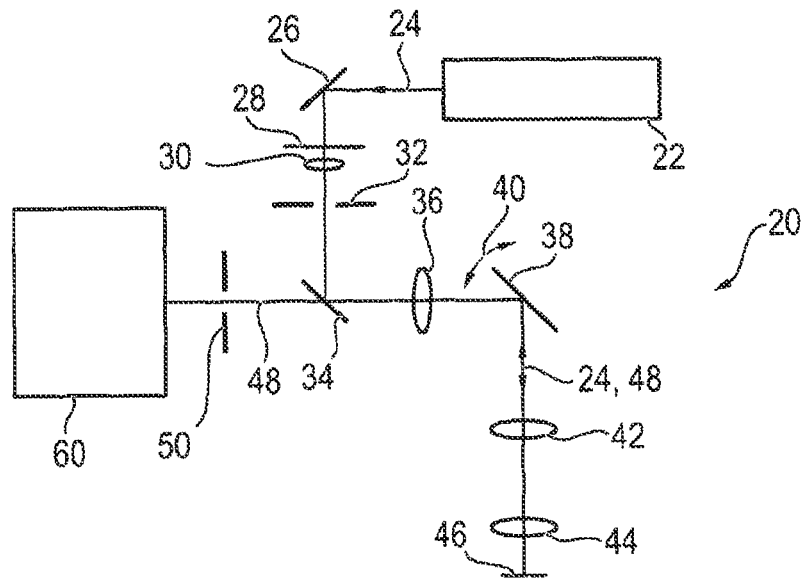
FIG. 1 shows a confocal laser scanning microscope.

According to a first aspect, the invention relates to a confocal laser scanning microscope for investigating a sample. The laser scanning microscope has a light source that generates an illumination light beam. A scanning unit deflects the illumination light beam in such a way that it optically scans the sample. A main beam splitter separates the illumination light beam from detected light proceeding from the sample. The detected light separated from the illumination light passes through a detection aperture. A detector apparatus detects the detected light passing through the detection aperture.

An aspect of the invention is notable for the fact that an optical element is arranged between the detection aperture and the detector apparatus in the beam direction, and separates the detected light into at least two beam bundles and spectrally divides it within the beam bundles.

The arrangement of the optical element behind the detection aperture in the detected beam direction allows detection of two of more wavelength regions of the detected light in the form of two or more beam bundles. This allows the wavelength regions to be detected to be particularly precisely separated from one another, determined, and/or detected. The wavelengths of the beam bundles, and thus the spectral regions of the detected light that are to be detected, can be unrestrictedly chosen and/or selected automatically. Further advantages result from the possibility of a particularly robust construction of the laser scanning microscope, and from good transmittance values. The laser scanning microscope configured in this fashion is moreover also suitable for fluorescence live time microscopy (FLIM) applications, for fluorescence correlation spectroscopy (FCS) applications, and for fluorescence resonance energy transfer (FRET) applications.

In an embodiment, the optical element comprises at least two different surfaces, on each one of which one of the beam bundles from the optical element respectively leaves. This can contribute, in simple fashion, to dividing the detected light into different beam bundles. The fact that the surfaces are "different" means in this context that the surfaces are separated from one another, for example, by an edge or an inflection.

According to a preferred embodiment, the optical element encompasses a prism arrangement. The prism arrangement can comprise two, three, or more different prisms. For example, the prism arrangement can comprise one prism for each beam bundle.

An embodiment provides that detected light already dispersed into beam bundles is spectrally limited by the fact that the wavelength regions of the individual beam bundles are limited. This is accomplished preferably with the aid of spectrally limiting elements that encompass, for example, apertures and/or light-guiding fibers. It is particularly advantageous in this context if a portion of one of the beam bundles that corresponds to the spectrally limited wavelength region is variable in terms of its wavelengths. In other words, the intention is to create the possibility of variably selecting smaller portions of the detected light within the beam bundles and detecting them in targeted fashion. The variability of the portions in terms of their wavelengths can be ensured, for example, by a displaceability of the spectrally limiting element, by the provision of movable mirrors, and/or by rotation or displacement of the optical element.

According to a second aspect, the invention relates to a method for investigating the sample, in which method the illumination light beam is generated and is deflected so that it optically scans the sample. The illumination light beam is separated from the detected light proceeding from the sample. A cross section of the detected light is limited with the aid of a detection aperture. The limited detected light is detected with the aid of detector units. Between the detection aperture and the detector units in the beam direction, the detected light is separated into at least two beam bundles and is spectrally divided within the beam bundles.

Elements of identical design or function are labeled with the same reference characters throughout the Figures.

FIG. 1 shows a confocal laser scanning microscope 20. Laser scanning microscope 20 comprises a light source 22 that generates an illumination light beam 24. Light source 22 encompasses at least one laser that generates light of a specific wavelength, of a small wavelength region, or of a large wavelength region. Light source 22 can, for example, encompass a white light laser that generates broad-band laser light (also referred to as "white light"). Alternatively thereto, two or more lasers can also be provided. Laser scanning microscope 20 is suitable for many applications in the sector of fluorescence microscopy, and in particular for the detection of fluorescent light. Laser scanning microscope 20 is particularly suitable for separate detection of fluorescent light of different fluorescent markers. Laser scanning microscope 20 is further suitable for implementing FLIM, FCS, and FRET applications.

Illumination light beam 24 emerges from laser light source 22 and is directed via a deflection mirror 26 and a filter 28 onto a first lens 30. After passing through first lens 30, illumination light beam 24 passes through an illumination aperture 32 and strikes a main beam splitter 34. Main beam splitter 34 directs illumination light beam 24 through a second lens 36 onto a scanning unit 38. Scanning unit 38 preferably comprises one or more mirrors, which are coupled to positioning elements in such a way that they are displaceable, for example in a motion direction 40, in reaction to a control signal. Scanning unit 38 directs illumination light beam 24, through a third lens 42 and a fourth lens 44 that form an objective, onto a sample 46 that is optically scanned with the aid of illumination light beam 24 as a result of the deflection of illumination light beam 24 by scanning unit 38.

Detected light 48 proceeding from sample 46 travels through third and fourth lens 42, 44, through scanning unit 38, and through second lens 36 to main beam splitter 34, which allows detected light 48 to pass through a detection aperture 50 to a detector apparatus 60. Detected light 48 is preferably fluorescent light. Alternatively thereto, however, detected light 48 can also be light reflected from sample 46 or, in the case of transmitted-light illumination, can also encompass transmitted light. Detected light 48 is detected as a function of positions of scanning unit 38, so that the region of sample 46 from which detected light 48 is currently deriving is known at every point in time during detection; this subsequently allows an image of sample 46 to be created.

Figure 2:
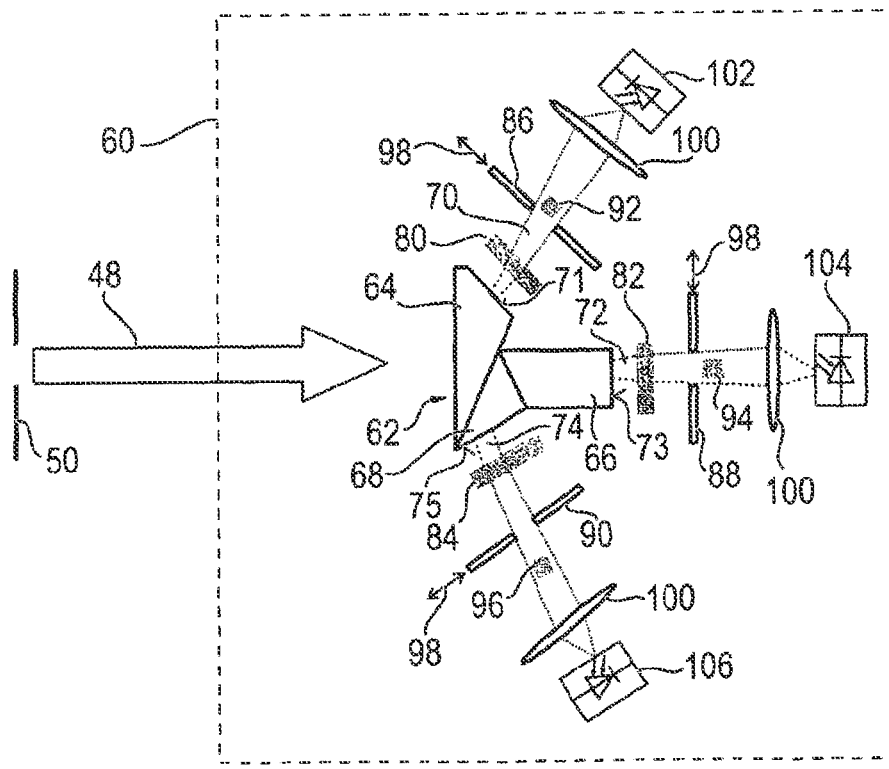
FIG. 2 shows a first embodiment of a detector apparatus of the laser scanning microscope.

FIG. 2 shows a first embodiment of detector apparatus 60. Detector apparatus 60 encompasses an optical element 62 that is preferably embodied as a prism arrangement. Optical element 62 encompasses a first prism 64, a second prism 66, and a third prism 68. Optical element 62 divides detected light 48 into multiple beam bundles 70, 72, 74. In particular, a first beam bundle 70 emerges from a first surface 71 of first prism 64. A second beam bundle 72 emerges from a second surface 73 of second prism 66. A third beam bundle 74 emerges from a third surface 75 of third prism 68. First beam bundle 70 encompasses light having wavelengths of a first wavelength region 80, detected light 48 of second beam bundle 72 encompasses detected light 48 of a second wavelength region 82, and detected light 48 of third beam bundle 74 encompasses detected light 48 of a third wavelength region 84. Optical element 62 can be embodied, for example, in accordance with a prism arrangement shown in U.S. Pat. No. 4,084,180 A1.

A first spectral segment 92 is cut out of first beam bundle 70 with the aid of a first positionable aperture 86. A second spectral segment 94 of detected light 48 is cut out of second beam bundle 72 with the aid of a second positionable aperture 88. A third spectral segment 96 of detected light 48 is cut out of third beam bundle 74 with the aid of a third positionable aperture 90. Segments 92, 94, 96 can also be referred to as "bandwidth segments" of the corresponding beam bundles 70, 72, 74. Segments 92, 94, 96 thus encompass light of small wavelength segments that are cut out of the corresponding wavelength regions 80, 82, 84 of beam bundles 70, 72, 74, where beam bundles 70, 72, 74 correspond to the spectrally split detected light 48. In other words, a coarse separation of detected light 48 into beam bundles 70, 72, 74 is accomplished with the aid of the prism arrangement, and a particularly fine and precise division of detected light 48 into segments 92, 94, 96 is accomplished within beam bundles 70, 72, 74. A shifting of positionable apertures 86, 88, 90 in corresponding aperture positioning directions 98 allows the wavelengths of segments 92, 94, 96 to be varied. Variation of the wavelengths of segments 92, 94, 96 allows adaptation of detected light 48 that is to be detected to different fluorescence maxima of the fluorescent makers used in sample 46.

The remaining detected light 48 in the form of segments 92, 94, 96 is directed via focusing lenses 100 onto corresponding detector units 102, 104, 106, in particular onto a first detector unit 102 that is associated with first beam bundle 70, onto a second detector unit 104 that is associated with second beam bundle 72, and onto a third detector unit 106 that is associated with third beam bundle 74. Detector units 102, 104, 106 encompass, for example, PMTs, APDs, or photodiodes that convert the detected light 48 into electrical signals and make it available to a control unit (not depicted).

Figure 3:
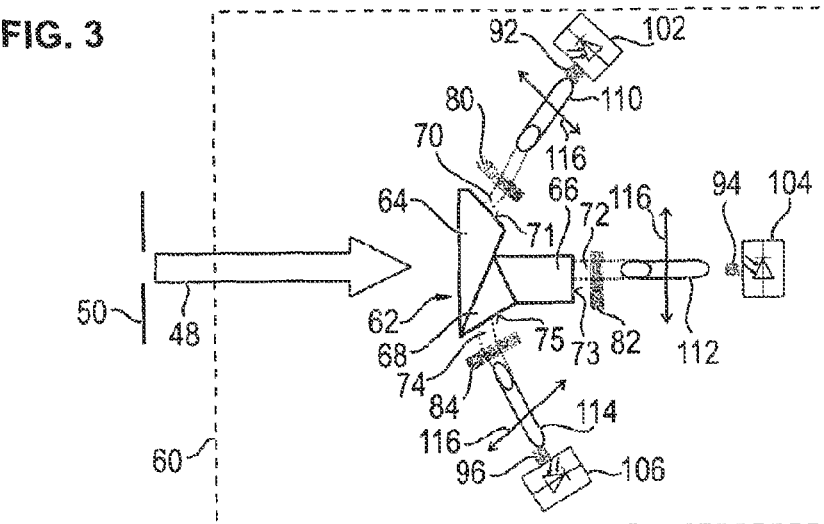
FIG. 3 shows a second embodiment of the detector apparatus.

FIG. 3 shows a second embodiment of detector apparatus 60. The second embodiment corresponds to the first embodiment shown in FIG. 1 in terms of optical element 62 and the division of detected light 48 into beam bundles 70, 72, 74, and in terms of detector units 102, 104, and 106 associated with beam bundles 70, 72, 74. In contrast to the first exemplifying embodiment, however, beam bundles 70, 72, 74 are spectrally limited by the fact that light guides 110, 112, 114 are provided instead of positionable apertures 86, 88, 90. Light-guiding fibers, for example glass fibers, can be used as light guides 110, 112, 114. In particular, first beam bundle 70 is coupled into a first light guide 110, second beam bundle 72 into a second light guide 112, and third beam bundle 74 into a third light guide 114. A cross section of light guides 110, 112, 114 is smaller than the cross section of the corresponding beam bundles 70, 72, 74, which brings about the spectral limiting of detected light 48 of beam bundles 70, 72, 74. Segments 92, 94, 96 of detected light 48 that emerge from light guides 110, 112, 114 strike the corresponding detector units 102, 104, 106. Segments 92, 94, 96, and in particular the wavelengths that these segments 92, 94, 96 encompass, can be varied by moving light guides 110, 112, 114 along light guide positioning directions 116. Light guides 110, 112, 114 are coupled for this purpose to corresponding positioning apparatuses.

Figure 4:
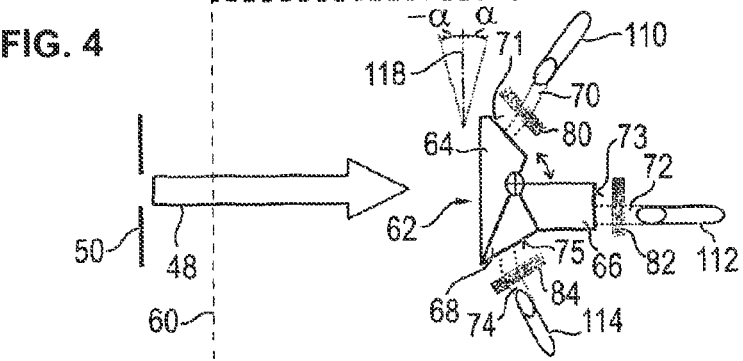
FIG. 4 shows a third embodiment of the detector apparatus.

FIG. 4 shows a third exemplifying embodiment of the detector apparatus, which corresponds to the second exemplifying embodiment according to FIG. 3 in terms of the shape of prism arrangement 62 and the provision of light guides 110, 112, 114. For the sake of clarity, depiction of detector units 102, 104, 106 and of segments 92, 94, 96 in FIG. 4 has been omitted. In contrast to the second exemplifying embodiment of detector apparatus 60, in the third exemplifying embodiment light guides 110, 112, 114 are not arranged movably, but instead the prism arrangement is arranged rotatably. In particular, optical element 62, in particular the prism arrangement, can be rotated so that its side facing toward detected light beam 48 is parallel to a reference line 118 and then, after rotation of the prism arrangement, encloses an angle α or −α with reference line 118. Rotation of the prism arrangement causes beam bundles 70, 72, 74 to be emitted in different directions. Because of the spectral division of beam bundles 70, 72, 74, different wavelength regions of beam bundles 70, 72, 74 enter light guides 110, 112, 114 as a function of the rotation angle, with the result that the wavelengths of segments 92, 94, 96 are varied.

Figure 5:
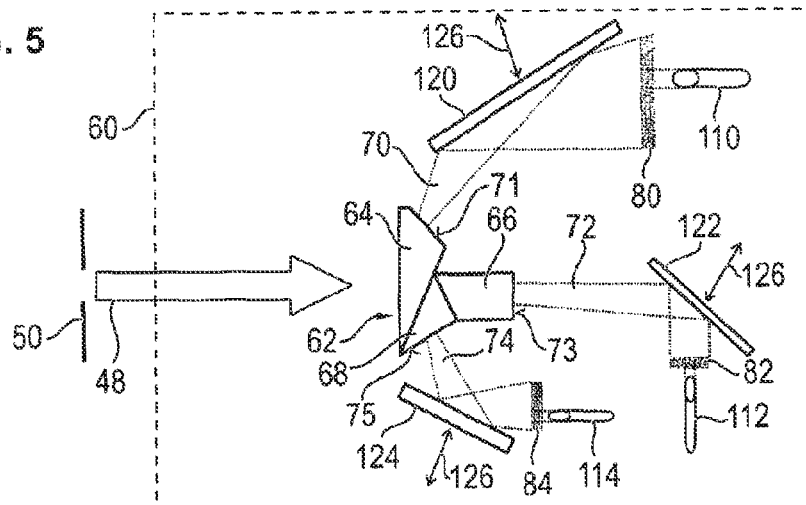
FIG. 5 shows a fourth embodiment of the detector apparatus.

FIG. 5 shows a fourth exemplifying embodiment of detector apparatus 60 that corresponds substantially to the exemplifying embodiment according to FIG. 4, i.e. to the third exemplifying embodiment. Depiction of segments 92, 94, 96 and of detector units 102, 104, 106 has been omitted in FIG. 5. In contrast to the rotatability of the prism arrangement according to the fourth exemplifying embodiment, the prism arrangement is fixed. A first mirror 120, a second mirror 122, and a third mirror 124 are, however, respectively arranged between the prism arrangement and light guides 110, 112, 114 in the beam direction of beam bundles 70, 72, 74. Mirrors 120, 122, 124 are movable along mirror positioning directions 126 and/or alternatively thereto are arranged rotatably, so that different spectral regions of beam bundles 70, 72, 74 can be coupled into light guides 110, 112, 114 as a function of positions of mirrors 120, 122, 124; this has an effect on the wavelengths of segments 92, 94, 96 In addition, a rotation of mirrors 120, 122, 124 brings about a stretching or compression of the light spectrum of segments 92, 94, 96, with the result that a bandwidth of the light to be detected can be adjusted.

The exemplifying embodiments of detector apparatus 60 that are shown make possible a spectrally separated detection of detected light 48, in the form of beam bundles 70, 72, 74, behind detection aperture 50. This offers a user the possibility of separating and detecting even more finely, in the form of segments 92, 94, 96, those wavelength regions of detected light 48 which are to be detected; in an embodiment that is not shown, further separation in the form of segments 92, 94, 96 can also be omitted, and the entire beam bundles 70, 72, 74 can be detected. In addition, alternatively thereto, the separation of segments 92, 94, 96 can be accomplished by restricting the sensitive sensor areas of detector units 102, 104, 106. In particular, the sensitive sensor areas can be smaller than the cross sections of beam bundles 70, 72, 74, so that only segments 92, 94, 96 of beam bundles 70, 72, 74 are detected. If this is combined with the rotatable prism arrangement, the wavelengths of segments 92, 94, 96 can then be varied in particularly simple fashion. The exemplifying embodiments shown can moreover be combined with one another.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the attached claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise.

PARTS LIST

20 Laser scanning microscope
22 Light source
24 Illumination light beam
26 Deflection mirror
28 Filter
30 First lens
32 Illumination aperture
34 Main beam splitter
36 Second lens
38 Scanning unit
40 Motion direction
42 Third lens
44 Fourth lens
46 Sample
48 Detected light
50 Detection aperture 60 Detector apparatus
62 Optical element
64 First prism
66 Second prism
68 Third prism
70 First beam bundle
71 First surface
72 Second beam bundle
73 Second surface
74 Third beam bundle
75 Third surface
80 First wavelength region
82 Second wavelength region
84 Third wavelength region
86 First positionable aperture
88 Second positionable aperture
90 Third positionable aperture
92 First segment
94 Second segment
96 Third segment
98 Aperture positioning direction
100 Focusing lens
102 First detector unit
104 Second detector unit
106 Third detector unit
110 First light guide
112 Second light guide
114 Third light guide
116 Light guide positioning direction
118 Reference line
120 First detector mirror
122 Second detector mirror
124 Third detector mirror
126 Mirror positioning direction

The invention claimed is:

1. A confocal laser scanning microscope for investigating a sample, the microscope comprising:
   a light source configured to generate an illumination light beam;
   a scanning unit configured to deflect the illumination light beam in such a way that the illumination light beam optically scans the sample;
   a main beam splitter configured to separate the illumination light beam from detected light proceeding from the sample;
   a detection aperture configured to allow the detected light separated from the illumination light beam to pass through the detection aperture, at least in part;
   at least two detector units, configured to detect the detected light passing through the detection aperture; and
   an optical element disposed between the detection aperture and the detector units in the beam direction,
   wherein the optical element is configured to separate the detected light into at least two beam bundles and spectrally divide the detected light within the beam bundles, and
   wherein the optical element comprises at least a first surface through which a first of the beam bundles leaves and a different, second surface through which another of the beam bundles leaves.

2. The microscope of claim 1, wherein the optical element comprises a prism arrangement.

3. The microscope of claim 1, further comprising: a spectrally limiting element configured to spectrally limit at least one wavelength region of the beam bundles, corresponding to a spectrally limited wavelength region, prior to detection.

4. The microscope of claim 3, wherein the spectrally limiting element comprises an aperture.

5. The microscope of claim 3, wherein a portion of the detected light that corresponds to the spectrally limited wavelength region is variable its terms of its wavelengths.

6. The microscope of claim 5, wherein the portion is variable in terms of its wavelengths by the spectrally limiting element being displaceably disposed.

7. The microscope of claim 5, further comprising:
   a detector mirror configured to direct the beam bundle onto the spectrally limiting element,
   wherein the detector mirror is displaceably, rotatably, or displaceably and rotatably so as vary the wavelengths of the portion of the spectrally limited detected light.

8. The microscope of claim 5, wherein the optical element is disposed rotatably, displaceably, or rotatably and displaceably, so as vary the wavelengths of the portion.

9. The microscope of claim 1, wherein the optical element is configured to separate the detected light into at least three or more beam bundles, and wherein the optical element is configured to spectrally divide the light within the beam bundles.

* * * * *